United States Patent
Petrovic et al.

(10) Patent No.: US 10,693,520 B2
(45) Date of Patent: *Jun. 23, 2020

(54) TRANSMIT ENERGY LEAKAGE CONTROL IN A RECEIVER

(71) Applicant: Entropic Communications, LLC, Carlsbad, CA (US)

(72) Inventors: Branislav Petrovic, La Jolla, CA (US); Shachar Kons, Haifa (IL); Michail Tsatsanis, Huntington Beach, CA (US)

(73) Assignee: Entropic Communications, LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/941,253

(22) Filed: Mar. 30, 2018

(65) Prior Publication Data

US 2018/0227009 A1 Aug. 9, 2018

Related U.S. Application Data

(63) Continuation of application No. 15/430,823, filed on Feb. 13, 2017, now Pat. No. 9,935,679, which is a continuation of application No. 14/955,358, filed on Dec. 1, 2015, now Pat. No. 9,571,154, which is a continuation of application No. 14/044,521, filed on Oct. 2, 2013, now Pat. No. 9,203,462.

(51) Int. Cl.
*H04B 1/525* (2015.01)
*H04B 1/12* (2006.01)

(52) U.S. Cl.
CPC ............. *H04B 1/525* (2013.01); *H04B 1/123* (2013.01)

(58) Field of Classification Search
CPC ................................ H04B 1/525; H04B 1/123
See application file for complete search history.

(56) References Cited

U.S. PATENT DOCUMENTS

| | | | | |
|---|---|---|---|---|
| 8,175,535 | B2 * | 5/2012 | Mu ........................ | H04B 1/123 |
| | | | | 455/283 |
| 8,422,540 | B1 | 4/2013 | Negus et al. | |
| 9,203,462 | B2 * | 12/2015 | Petrovic ................. | H04B 1/123 |
| 9,571,154 | B2 * | 2/2017 | Petrovic ................. | H04B 1/525 |
| 9,935,679 | B2 * | 4/2018 | Petrovic ................. | H04B 1/123 |
| 2007/0184782 | A1 | 8/2007 | Sahota et al. | |

(Continued)

OTHER PUBLICATIONS

International Search Report for PCT/US2014/058554 dated Dec. 30, 2014. (2 pages).

*Primary Examiner* — Leon Flores
(74) *Attorney, Agent, or Firm* — McAndrews, Held & Malloy, Ltd.

(57) ABSTRACT

Systems and methods are provided for handling interference during communication of signals. A receive control signal may be generated in a transceiver leakage between a transmit path and a receive path in a transceiver, at least one signal applied or generated in the transmit path, and at least one signal applied or generated in the receive path. The receive control signal may then be applied adjust or control processing of received signals. One or more characteristics associated with the receive control signal may be set and/or adjusted based on one or more control signals applied to the transmit path. Transmit power may be tracked, and the receive control signal may be adjusted based on the tracking of the transmit power.

21 Claims, 5 Drawing Sheets

(56) References Cited

U.S. PATENT DOCUMENTS

| | | |
|---|---|---|
| 2008/0089397 A1 | 4/2008 | Vetter et al. |
| 2009/0186582 A1 | 7/2009 | Muhammad et al. |
| 2009/0213770 A1 | 8/2009 | Mu |
| 2013/0044791 A1 | 2/2013 | Rimini et al. |
| 2013/0102254 A1 | 4/2013 | Cyzs et al. |
| 2014/0269864 A1* | 9/2014 | Aparin .................. H04B 1/40 375/221 |

* cited by examiner

FIG. 5

TRANSMIT ENERGY LEAKAGE CONTROL IN A RECEIVER

CLAIM OF PRIORITY

This patent application is a continuation of U.S. patent application Ser. No. 15/430,823, filed on Feb. 13, 2017, which is a continuation of U.S. patent application Ser. No. 14/955,358, filed on Dec. 1, 2015, which in turn is a continuation of U.S. patent application Ser. No. 14/044,521, filed Oct. 2, 2013, now U.S. Pat. No. 9,203,462. Each of the above identified applications is hereby incorporated herein by reference in its entirety.

TECHNICAL FIELD

The disclosed method and apparatus relates to controlling interference in communication systems, and more particularly, some embodiments relate to control of interference with received signals when the interference is generated by a local transmitter.

BACKGROUND

Figure 1:
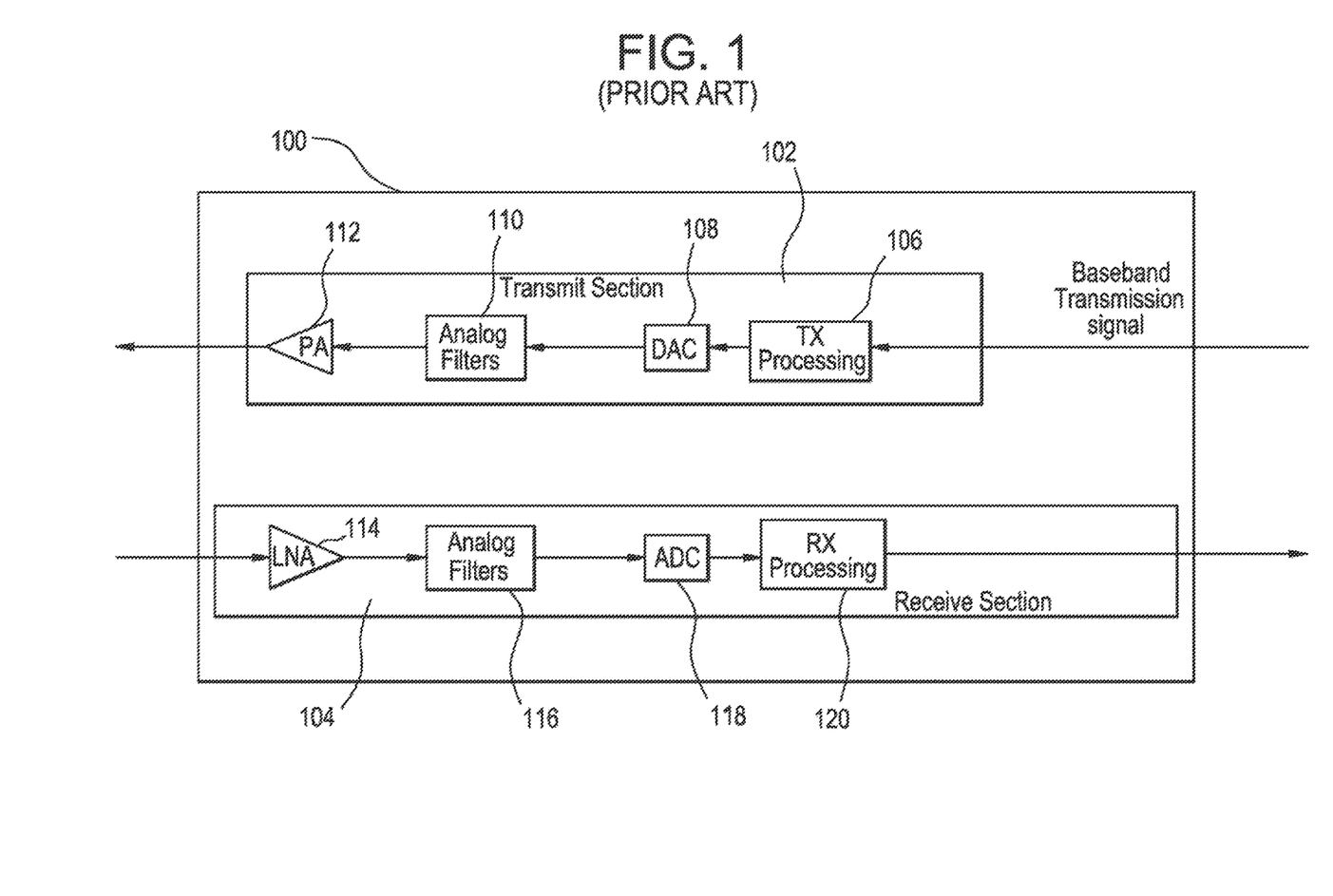
FIG. 1 is a block diagram of a prior art broadband transceiver.

Many communications systems of today operate over a very broad spectrum of frequencies. Such systems are commonly referred to as "broadband systems". FIG. 1 is an illustration of a transceiver 100 used in one such broadband system. The transceiver 100 of FIG. 1 includes a transmit section 102 and a receive section 104. The transmit section 102 includes a transmit processor 106, digital to analog converter (DAC) 108, set of analog filters 110 and a power amplifier 112. The receive section 104 includes a low noise amplifier (LNA) 114, analog filters 116, analog to digital converter (ADC) 118, and a receive processor 120. Broadband systems are more common today than they were in the past because of the increase in the need to communicate large amounts of data. The continuing growth of the internet and use of multimedia technologies have contributed to the growth in the amount of data that needs to be communicated.

One particular industry in which there is a need to communicate large amounts of data is the entertainment industry. The development and evolution of home entertainment networks allows entertainment content to be delivered to a home from a content provider. Such content can then be distributed throughout a home or multi-dwelling unit (MDU) over a home entertainment network.

Communication of entertainment content, such as high definition video streams, requires networks that have very large capacity. To achieve the necessary capacity, many modern communications and content distribution networks rely upon broadband systems, such as satellite television networks and networks that operate in accordance with the well-known Multimedia over Coax Alliance (MoCA) standard or the well-known Data Over Cable Service Interface Specification (DOCSIS) standard.

The advantage of broadband systems is that they allow content to be spread over the large expanse of frequencies that are available. The disadvantage of broadband systems is that there is a greater chance that interference might be present in the frequencies used to communicate data over the system. That is, there is a limited range of frequencies that are practical for use in communicating information, whether that information is being communicated wirelessly, such as is the case in satellite transmission systems, or over wires, such as is the case with cable television (CATV) networks and fiber optic networks. In some cases, it is desirable to receive content over both a CATV network and a satellite network. In other cases, a MoCA network is used to distribute content that is received by a satellite receiver. In other cases, the well-known DOCSIS protocol is used together with MoCA to distribute information and content throughout a home or group of apartments within an MDU. Because these systems operate over very broad range of frequencies, it is difficult to allocate unique frequencies to each.

Because more than one broadband system might be in use, transmissions from one system may interfere with the reception of transmission from another broadband system. Furthermore, harmonics created by one broadband system might be occur in the frequencies used by another broadband system. In the past, when communicating over relatively narrow band communication systems, it was less likely that one system would create interference for other systems. Frequencies have traditionally been allocated for narrow-band systems to minimize the risk of interference. However, in broadband systems, there is a greater chance that the frequencies used by one broadband system will interfere with the reception of signals of other broadband systems. This problem is further exacerbated by a increased likelihood that transmitters and receivers from different broadband systems might be integrated together into a relatively small package. In many cases today, the transmitter of one broadband system shares a substrate (silicon or printed circuit board) with the receiver from another broadband system.

In one case in particular, MoCA has an operating range of 1.5 GHz. DOCSIS 3.1 has an operating frequency range of close to 2 GHz. In allocating this frequency band, it was hard to find discrete bands in which each can operate without interference. In the case of MoCA and satellite reception, satellite transmission systems that communicate television content to homes operate at frequencies that are within the range of harmonics of the signals used to communicate over MoCA.

This problem is particularly acute when the transmitter of one broadband system is co-located with, or located in close proximity to, the receiver of another broadband system. In such cases, it can be very difficult to prevent the high power transmissions generated by the transmitter of one system and/or harmonics generated by one system) from interfering with the reception of signals to be received by the other system.

There are essentially two ways in which to prevent interference. The first way is to provide discrete times at which each system transmits and receives. This is commonly referred to as "time diversity". The second way is to provide discrete frequencies over which the systems transmit and receive such that the two systems do not transmit on the same frequency. This is commonly referred to as "frequency diversity". For example, one way in which these problems are solved is to try to coordinate the transmission and reception of signals by the different broadband systems. In some cases, transmissions by a first broadband system are "blanked" during times when a second broadband system is attempting to receive signals.

In other systems, the particular range of frequencies is limited to less than the full spectrum that would otherwise be available to each broadband system. It should be noted that in addition to the fundamental frequencies, harmonics of those frequencies used for transmission can be sufficiently powerful that they interfere with attempts by other systems to transmit at those harmonic frequencies.

A third way to address the problem of transmission signals generated by a first broadband system impinging upon the reception of signals transmitted by another broadband system is to use a different medium for the transmission of signals by each broadband system. The definition of "different medium" can include two coaxial cables that are not coupled to one another. However, the definition may also include the case in which a filter or diplexer is used to block signals from one medium from coupling to the other medium. In this case, the medium used by one broadband system must be sufficiently isolated from the medium used by another system so that no interference is generated between the two broadband systems. Because the receivers of such broadband systems tend to be relatively sensitive, the isolation between the mediums must be very high. This can be difficult to achieve due to leakage and cross-talk between the broadband systems. That is, diplexers and physical distance between components of the two broadband systems are typically used to isolate one broadband system from another. However, there remain challenges to achieving the required isolation in systems in which the transmitter of one broadband system is in close proximity to the receiver of another broadband system.

The first two of these techniques (i.e., using time or frequency diversity) for dealing with interference between broadband systems result in a reduction in the available resources (i.e., reduced bandwidth) that can be used to communicate information. The third technique (independent medium) presents challenges to achieving the required isolation.

Therefore, there is a need for a technique that allows a first broadband system to transmit in close proximity to the receiver of a second broadband system on overlapping frequencies without the transmissions of the first broadband system interfering with reception by the second broadband system.

SUMMARY OF THE DISCLOSED METHOD AND APPARATUS

The following presents a simplified summary of one or more embodiments in order to provide a basic understanding of some aspects of such disclosed methods and apparatus. This summary is not an extensive overview of the one or more embodiments disclosed herein, and is not intended to either identify key or critical elements of the embodiments or delineate the scope of such embodiments. Its sole purpose is to present some concepts of the described embodiments in a simplified form as a prelude to the more detailed description presented later.

One embodiment of the presently disclosed method and apparatus is a transceiver that transmits over a first medium in accordance with a first broadband system and receives over a second medium in accordance with a second broadband system. The transceiver comprises a transmit section and a receive section. The transmit section has two outputs. It transmits signals over the first medium through the first output. The receive section receives signals over the second medium through a first input. The transceiver further comprises an interference control section having three inputs and an output.

The interference control section's first input is coupled to the second output of the transmit section. The interference control section's second input is coupled to a first output of the receive section. The third input to the interference control section allows a gain control signal to be introduced to the interference control section to synchronize the transmit section gain adjustments with adjustments in the interference control section.

The output of the interference control section is coupled back to a second input to the receive section. In addition, there exists a leakage path from the transmit section to the receive section. The leakage path is a signal path between the transmit section and the receive section that is not intended and that ideally would not exist. However, due to practical considerations, the leakage path cannot be eliminated.

In accordance with the disclosed method and apparatus, a portion of the energy of the transmit signal generated by the transmit section and output through the transmit section's second output is coupled to the first input of the interference control section via the second output of the transmit section.

In accordance with one embodiment of the disclosed method and apparatus, the leakage path from the transmit section to the receive section is modeled. In accordance with one embodiment of the disclosed method and apparatus, the model is determined during the design of the transceiver hardware. Alternatively, the modeling can be done in a learning mode during operation of the transceiver and stored for later use during normal mode. Modeling the leakage path allows generation of the first approximation of the transfer function of the leakage path traversed by the signals coupled from the transmit section to the receive section. The first approximation narrows down the universe of possible distortions that might occur due to the transfer function of the leakage path. Narrowing down the universe of possible solutions makes the complexity of the interference control section more manageable. Such distortions in the frequency response include, among others, distortions in the delay characteristics, the phase characteristics and the amplitude characteristics of the signal coupled to the receive section through the leakage path. By reducing the universe of possible distortions, circuitry within the interference control section can be designed that ensures that an interference control signal can be generated that efficiently and effectively approximates the signal coupled by the leakage path to the receive section without undue complexity in the circuitry.

In addition, in one embodiment of the disclosed method and apparatus, the first approximation is used as the basis for creating an initial condition for generating an interference control signal. The interference control signal is modified by a feedback loop which is controlled based upon quality metrics measured within the receive section. In one embodiment, the quality metric is the residual error in the signal output from the interference control section. The quality metric is then fed back to cause the loop that generates the interference control signal to converge and thus allow generation of an output with minimal residual error.

The interference control section sums the interference control signal with the signal coupled to the second input to the interference control section from the receive section. This sum is then output from the interference control section and coupled to the second input of the receive section. In one embodiment of the disclosed method and apparatus, the receive section further processes the signal coupled from the interference control section in order to demodulate and decode the content received on the signal from the second medium. In one embodiment, an error rate of the decoded signal is used to determine the quality metric. The quality metric is thus fed back to the interference control section. An iterative process is used to adjust parameters in the circuitry based on those measured quality metrics.

In accordance with one embodiment, a receiver receives a first broadband signal over a second medium. The receiver performs a first process on the first broadband signal to generate a processed broadband signal. The processed broadband signal is then coupled from the receiver to an interference control section. The receiver then receives a reduced interference signal from the interference control section. The receiver further processes the reduced interference signal and provides a quality metric to the interference control section.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Overview of the Transceiver

Figure 2:
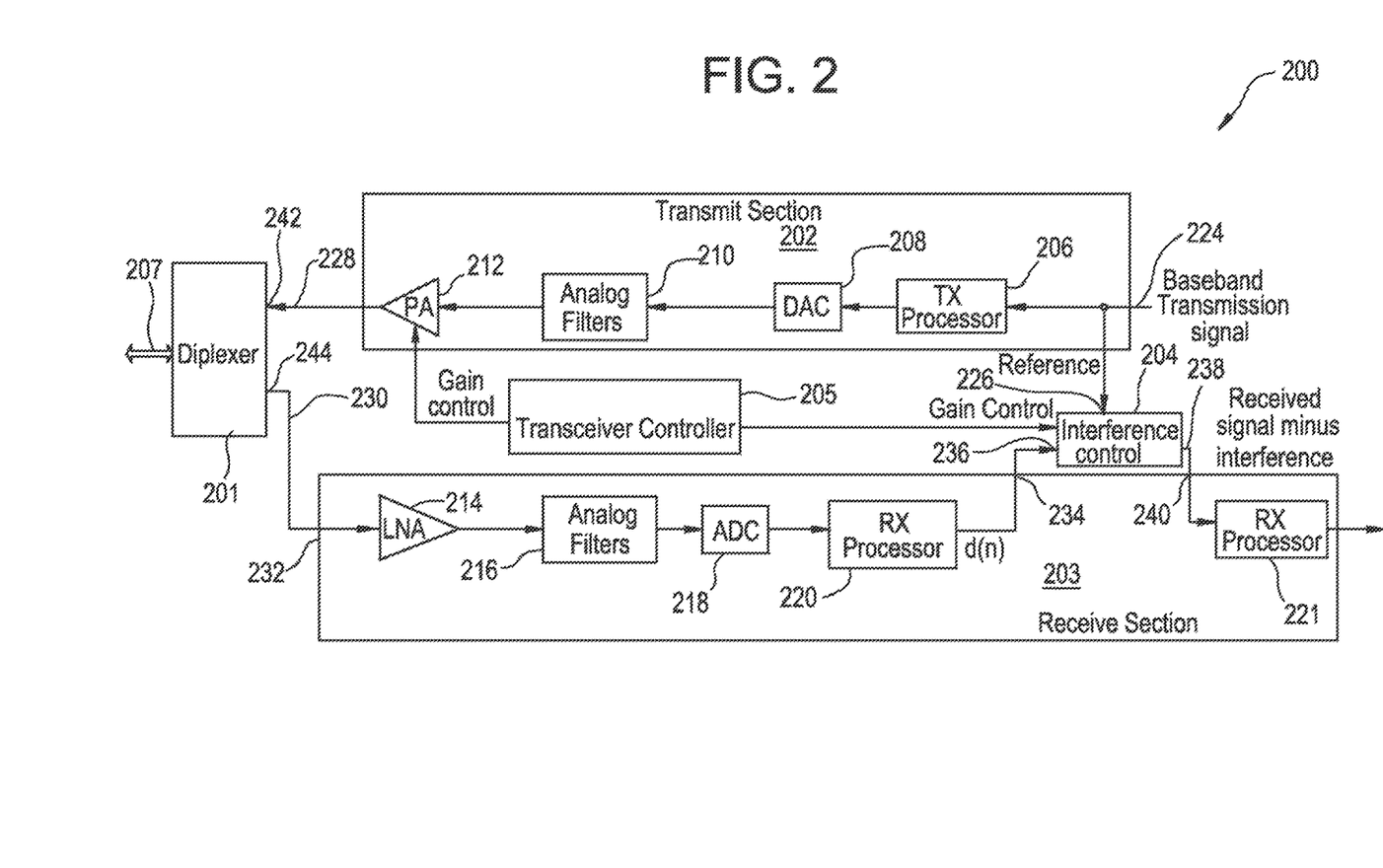
FIG. 2 is a block diagram of a transceiver in accordance with the disclosed method and apparatus.

FIG. 2 is a block diagram of a transceiver 200 in accordance with the disclosed method and apparatus. The transceiver 200 includes a transmit section 202, a receive section 203, an interference control section 204 and a transceiver controller 205. The transmit section 202 transmits signals into a diplexer 201. The transmit section 202 includes a transmit processor 206, digital to analog converter (DAC) 208, analog filters 210 and power amplifier (PA) 212. The receive section 203 includes a low noise amplifier (LNA) 214, analog filters 216, an analog to digital converter (ADC) 218 and a receive processor 220. The receive section 203 receives signals from the diplexer 201. In one embodiment of the disclosed method and apparatus, the receive section 203 includes a second receive processor 221.

Transmit Section

The following is a brief description of the operation of the transmit section 202. Initially, a baseband transmission signal having content to be transmitted is coupled to a first input port 224 of the transmit section 202. The baseband signal is coupled to the transmit processor 206. The transmit processor 206 prepares the signal for transmission. That could include upconverting the frequency of the baseband signal to a radio frequency (RE) frequency appropriate for transmission over a first medium 228. In accordance with one embodiment of the disclosed method and apparatus, upconversion of the signal is performed in the transmit processor 206 by a DAC interpolator 208 (or rotator). In one embodiment, a portion of the energy of the baseband signal is coupled to a first input 226 to the interference control section 204. In some embodiments, the transceiver controller 205 provides control signals to the transmit section in a manner that is well known to those skilled in the art. In one such embodiment, the control signals include gain control signals provided to the PA 212 that alter the amount of gain provided by the PA 212. In addition, in one embodiment, the control signals provide control inputs to the transmit processor 206 and the DAC 208. Such control signals are well known to those skilled in the art. Details regarding the interference control section 204 will be provided below.

The output of the transmit processor 206 is coupled to a DAC 208 which receives the digital output from the transmit processor 206 and outputs an analog signal representative of the digital input to the DAC 208. The analog output from the DAC 208 is coupled to the analog filters 210. In one embodiment, the analog filters 210 are reconstruction filters that smooth the output of the DAC 208. The output from the filters 210 is coupled to the PA 212 which amplifies the signal appropriately for transmission over the first medium 228.

Receive Section

The following is a brief description of the receive section 203. The receive section 203 receives signals from a second medium 230 through an input port 232. The received signal is coupled from the input port 232 to an LNA 214. The LNA 214 amplifies the received signal. The amplified output from the LNA 214 is coupled to one or more analog filters 216. The analog filters 216 reduce unwanted out of band signals produced either by the LNA 214 or received from a common port 207 of the diplexer 201. The output from the analog filters 216 is coupled to the ADC 218. The ADC 218 digitizes the output from the analog filters 216. The digital output from the ADC 218 is coupled to a first receive processor 220. In accordance with one embodiment of the disclosed method and apparatus, the first receive processor 220 is a satellite tuner and decimator which allows the content of the received signal to be down-converted. The output d(n) from the receive processor 220 is coupled via a first output port 234 of the receive section 203 to a first input port 236 of the interference control section 204. The interference control section 204 combines the output signal d(n) with the an interference control signal generated within the interference control section 204. Details regarding generation of the interference control signal are provided further below. This combined signal is output on a first output port 238 of the interference control section 204. The output from the interference control section 204 is essentially the received signal that was input to the interference control section 204 through the input port 236, but stripped of interfering signals originating from transmit section 202 that were received with the received RF signal through the input port 232. The output from the interference control section 204 is then coupled through a second input 240 of the receive section 203 to the second receive processor 221. The second receive processor 221 performs final processing as part of the satellite tuner functionality.

Leakage Path Model

Figure 3:
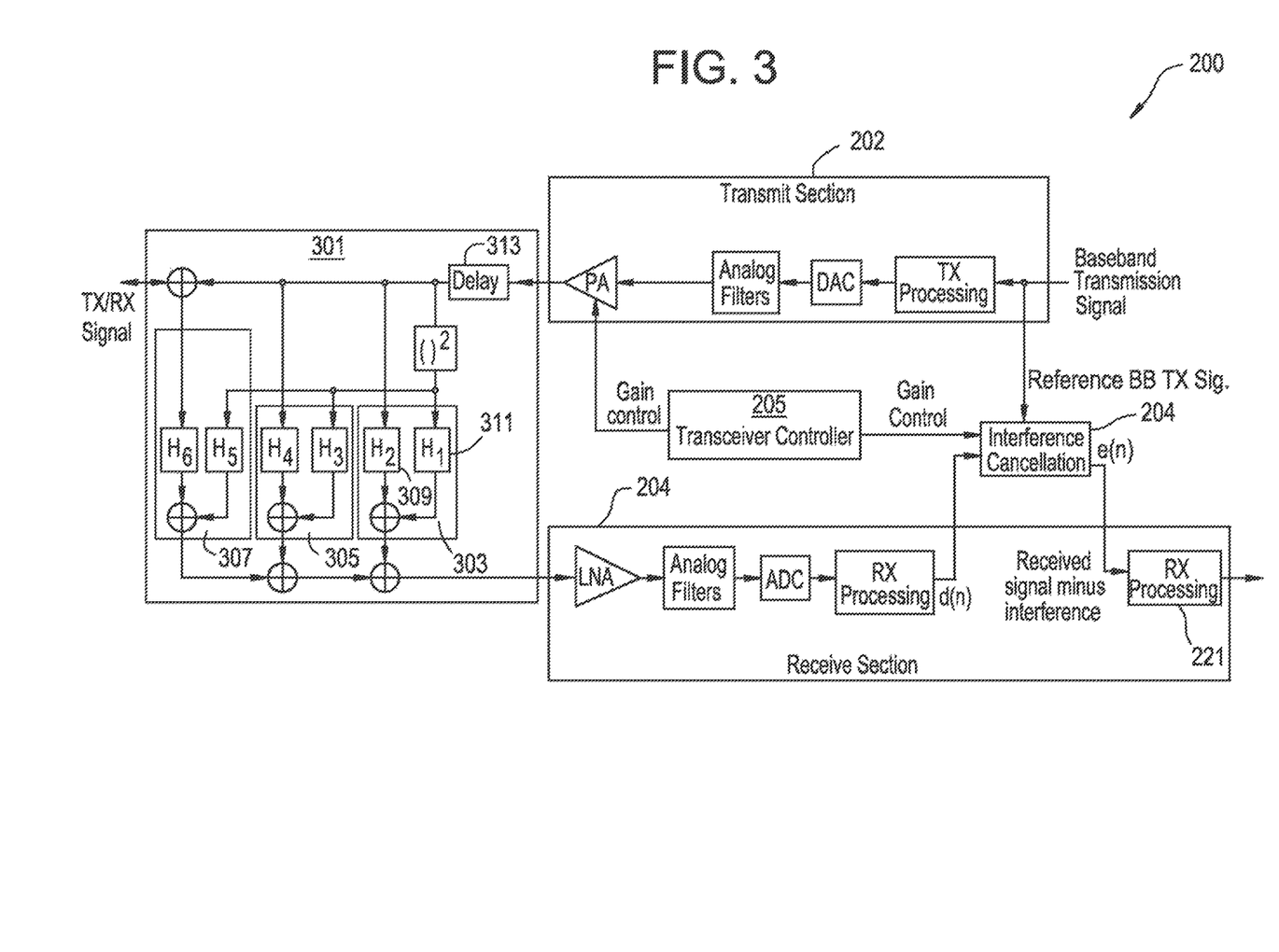
FIG. 3 is a block diagram of a transceiver in accordance with the disclosed method and apparatus illustrating a model of the leakage path between the transmit section and the receive section of the transceiver.

FIG. 3 is a block diagram of one embodiment of the disclosed method and apparatus illustrating a model 301 of a leakage path from a transmit section 202 of a transceiver 200 to a receive section 203. The transceiver 200 in FIG. 3 is essentially identical to the transceiver 200 illustrated in FIG. 2. Accordingly, the model 301 shown in FIG. 3 of the leakage path merely illustrates the leakage that occurs from the transmit section 202 to the receive section 203 of the transceiver 200 shown in FIG. 2.

As shown in FIG. 3, the output from the transmit section 202 is coupled to the leakage path represented by the model 301. In accordance with one embodiment of the disclosed method and apparatus, the modeling is done during design of the hardware of the transceiver. Alternatively, the modeling is done in a learning mode during operation of the transceiver using the adaptive filters of the interference control section 204 and LMS feedback function performed in a coefficient adaption circuit 419 (see FIG. 4 and the associated description provided below). In accordance with one such embodiment, the adaptive filters can be used to continuously track the characteristics of the signal coupled through the leakage to continuously adapt the model. The model is then stored for later use during a normal mode of operation. For the sake of brevity, the model 301 is hereafter referred to simply as the "leakage path". However, it should be understood that the leakage path is merely represented by the model 301 and that the elements described herein are merely representations of the characteristics of the leakage path being modeled. Three paths from the output of the transmit section 202 to the input of the receive section 203 are taken into account by the model 301.

The first path 303 represents the leakage through the diplexer 201 (i.e., the signal that traverses the diplexer from the transmit port 242 to the receive port 244). The second path 305 represents the leakage between pins of a package (for example, pins of a package of an RF integrated circuit, not shown) that contains both the transmit section 202 and the receiver section 204. The third path 307 represents the internal leakage within the package. Each path 303, 305, 307 comprises two transfer functions. The first transfer function 309 represents the fundamental of the distortion that occurs to the signal coupled between the output of the transmit section 202 and the input of the receive section 203. The second 311 represents a first harmonic of the distortion. By modeling the fundamental and the harmonic distortion independently, the model can be made more accurate. The filters of the diplexer 201, as well as analog filters 210, cause delay. Accordingly, a delay 313 is introduced to the model to account for the delay through the transmit path.

Interference Control Section

Figure 4:
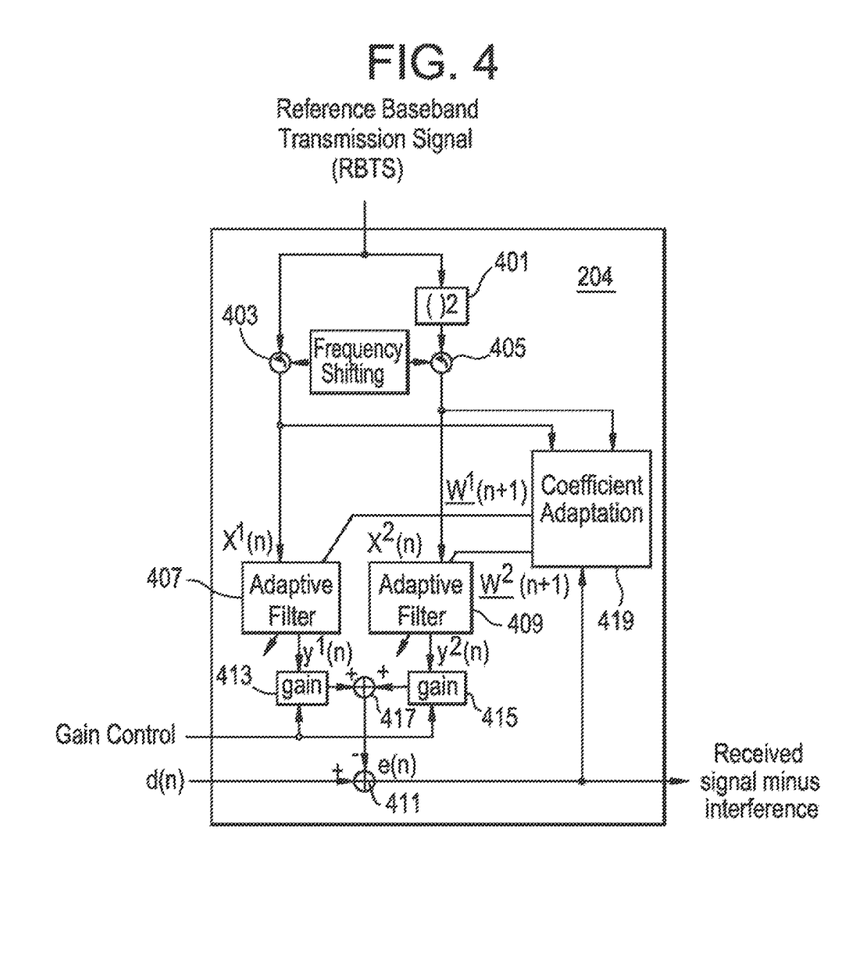
FIG. 4 is a detailed diagram of the interference control section in accordance with one embodiment of the disclosed method and apparatus.

FIG. 4 is a detailed block diagram of one embodiment of the interference control section 204 of a transceiver in accordance with the disclosed method and apparatus. As can be seen in FIGS. 2, 3 and 4, there are three inputs and one output to the interference control section 204. The first input to the interference control section 204 is a reference baseband transmission signal (RBTS). As can be seen in FIG. 3, the RBTS is coupled from the transmit section 202 to the interference control section 204. The second input to the interference control section 204 is the receive signal+transmit leakage d(n). As seen from FIG. 3, this signal is coupled from the receive section 203 to the interference control section 204. In one embodiment, a gain control signal is coupled to the interference control section 204 from the transceiver controller 205.

Again with reference to FIG. 4, the RBTS is coupled to a circuit that generates the square of the RBTS (i.e., performs a squaring function 401). It will be noted that the RBTS is a digital signal. In one embodiment, the squaring function 401 is performed by a signal processor. However, it should be understood that the disclosed method and apparatus is applicable to an embodiment in which the signal is processed in analog form, as well. That is, in one embodiment, the RBTS is provided to the interference control section 204 as an analog baseband transmission signal and the squaring function 401 is performed using an analog squaring circuit. In general, use of analog processing is possible for all of the functions performed within the interference control section 204. However, for the sake of brevity and simplicity, the processes are described herein as being performed in the digital domain.

The RBTS is also coupled to a first upconverter 403. The upconverter 403 digitally upconverts the RBTS. The upconversion is similar to the upconversion that takes place in the transmit processor 206 shown in FIG. 2 and described above. Accordingly, in one embodiment, the upconversion can be performed by a DAC interpolator. Alternatively, the upconversion can take place in a rotator. Similarly, the output from the squaring function 401 is upconverted by the upconverter 405. The upconverted output signals from the upconverters 403, 405 are each coupled to one of two adaptive filters 407, 409. The upconversion places these signals at the same frequencies as the interference within to be removed from the signal d(n).

Figure 5:
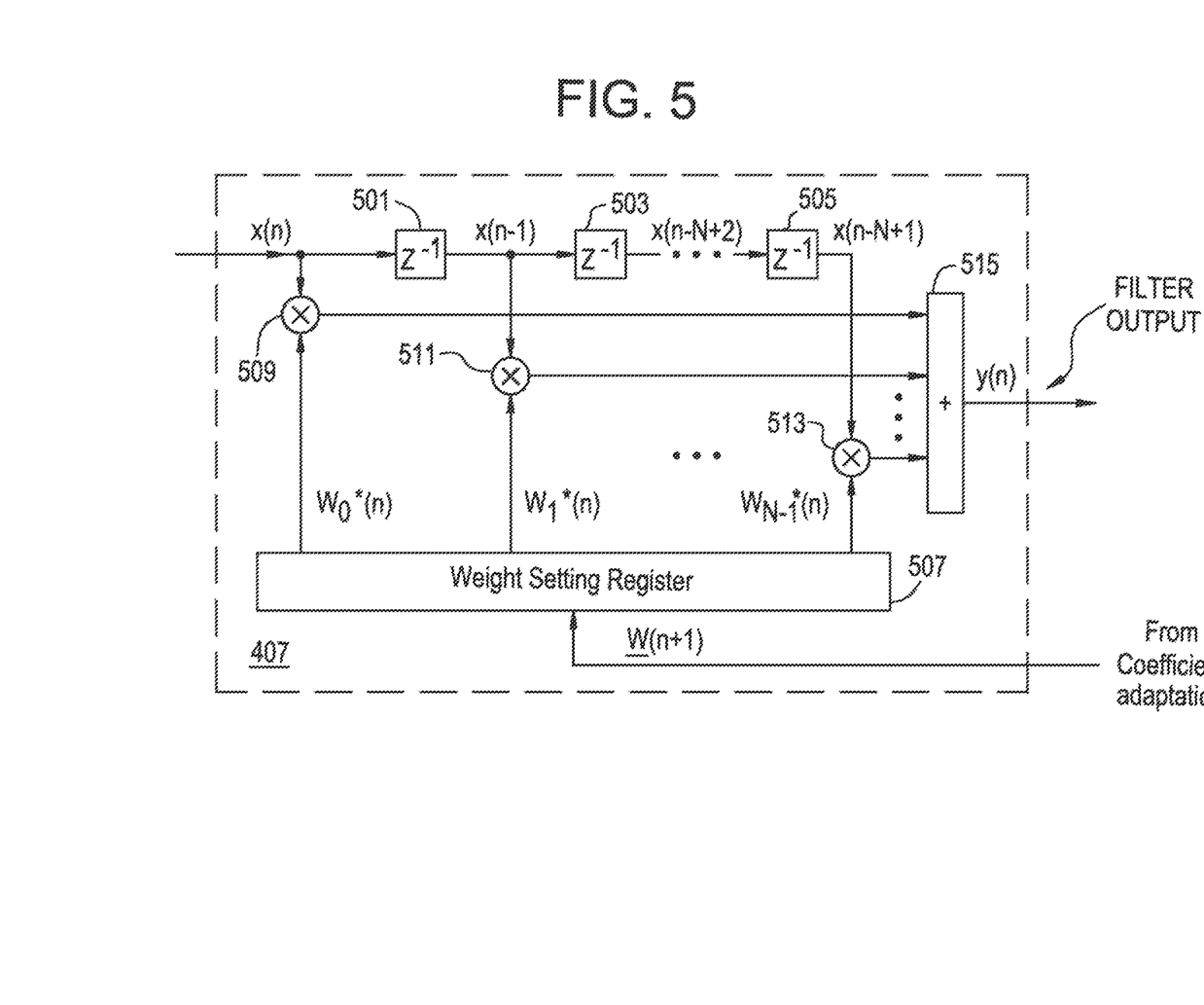
FIG. 5 shows the details of an adaptive filter used in the disclosed method and apparatus.

FIG. 5 shows the details of an adaptive filter 407, 409. The term $Z^1$ denotes a delay imposed by each functional block 501, 503, 505. The array W(n) is the set of coefficients applied to the adaptive filter 407 at time n. The values associated with the array W(n+1) (i.e., the next set of coefficient values) are coupled to a weight setting register 507 that stores the values. It should be noted that in FIG. 4, there are two such adaptive filters. Accordingly, the array W(n+1) shown in FIG. 5 is shown in FIG. 4 as $W^1(n+1)$ and $W^2(n+1)$. Similarly, the other inputs and outputs to the adaptive filter are indexed in FIG. 4 with subscripts to indicate that different signals are applied to each adaptive filter 407, 409.

The stored values from the weight setting register 507 are coupled to a plurality of weighting circuits 509, 511, and 513. Each of the weighting circuits 509, 511, 513 adjust the amount of the signal x(n) from each weighting circuit that is to be summed together in a summing circuit 515 based on the particular value of the coefficients $w_0^*(n) \ldots w_{N-1}^*(n)$. Accordingly, an interference control signal y(n) output from the adaptive filter is the weighted sum of the various delays of the input signal x(n).

Therefore, it can be seen that:

$$y(n) = w_0^*(n) \times (n) + w_1^*(n) \times (n-1) + \ldots + w_{N-1}^*(n) \times (n-N+1); \quad \text{EQ. 1}$$

where y(n) is the interference control signal output from the adaptive filter;

e(n) is the residue error-corrected value as shown in FIG. 4 being output from a summing circuit 411 that sums the interference control signals $y^1(n)$, $y^2(n)$ from the two adaptive filters with the received signal+transmit leakage, d(n) shown in FIG. 2 and FIG. 3;

μ>0 is the adaptation step size;

W(n)=[$w_0(n)$, $w_1(n)$, ... $w_{N-1}(n)$] is the tap-weight vector value at time n; and the next iteration is computed using the following formula:

$$W(n+1) = W(n) + 2\mu e^*(n) \times (r); \quad \text{EQ. 2}$$

W(n+1) is the tap-weight vector next value at time n+1, and where W is generalized representation of vectors $W^1$, $W^2$.

In general, all terms in above equations are complex. The asterisk (*) denotes a "conjugate complex number". All multipliers are complex, as is the case when the signals are complex (I, Q).

In accordance with one embodiment of the disclosed method and apparatus, the residual error signal e(n) is used as a quality metric that is applied to a least mean squares (LAS) formula as show above in equation EQ. 2 to improve the accuracy of the weighting array W(n).

Alternatively, the quality metric might be derived from an error rate determined within the receive processor 221. That is, adjustments are made to the weights W(n) to reduce the error rate determined at the receive processor 221. It will be understood by those skilled in the art that other means for determining convergence of the adaptive filters are possible that use other quality metrics to determine how effectively the interference has been controlled. Any such known quality metrics would be within the scope of the disclosed method and apparatus.

Returning to FIG. 4, each gain circuit 413, 415 receives a gain control signal from the transceiver controller 205 shown in FIGS. 2 and 3. These gain control signals are synchronized with gain control signals that are coupled to the PA 212 shown in FIGS. 2 and 3. By providing gain control signals to the interference control section, large or rapid changes in the gain control to the PA 212 can be accounted for in the interference control section without waiting for the control loop through the adaptive filters to correct for such gain changes to the amplitude of the signals that are coupled to the receive section through the leakage path. Accordingly, the interference control section 204 tracks the transmit power and receives a control signal to adjust the amplitude of an interference control signal y(n) to speed up the response of the interference control section.

The outputs from the gain circuits 413, 415 are then summed in a summing circuit 417. The output from the summing circuit 417 is coupled to the summing circuit 411. As noted above, the output from the summing circuit 417 is subtracted from the input d(n) to generate the residual error signal e(n) which is coupled to the coefficient adaptation circuit 419 which performs the calculation to determine the next set of coefficients W(n+1) for each adaptive filter. The residual error signal is also output from the interference control section 204 and coupled to the second receive processor 221.

While various embodiments of the disclosed method and apparatus have been described above, it should be understood that they have been presented by way of example only, and should not limit the claimed invention. For example, while the disclosed method and apparatus is disclosed in the context of a broadband system, it is equally applicable to narrowband systems. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, the order in which the functions that are described herein shall not mandate that various embodiments be implemented to perform the recited functionality in the same order unless the context dictates otherwise.

What is claimed is:

1. A system, comprising:
   one or more signal processing circuits comprising a receive path and a transmit path; and
   a control circuit that:
   generates a receive control signal based on:
   leakage between the transmit path and the receive path,
   at least one signal applied or generated in the transmit path, and
   at least one signal applied or generated in the receive path; and
   applies the receive control signal into the receive path to adjust or control processing of received signals.

2. The system of claim 1, wherein the control circuit sets one or more characteristics associated with the receive control signal based on one or more control signals applied to the transmit path.

3. The system of claim 1, wherein the control circuit comprises one or more filters that apply filtering during generation of the receive control signal.

4. The system of claim 3, wherein each filter of the one or more filters generates a filtering output based on applying a plurality of weighted adjustments to a corresponding input to the filter.

5. The system of claim 3, wherein the control circuit determines one or more coefficients that are applied to each of the one or more filters.

6. The system of claim 5, wherein each of the one or more filters generates, based on the one or more coefficients, a plurality of weights that are applied during filtering operations.

7. The system of claim 1, wherein the control circuit tracks characteristics of one or more signals in the transmit path that leak into the receive path.

8. The system of claim 1, wherein the control circuit tracks transmit power.

9. The system of claim 1, wherein the control circuit adjusts the receive control signal based on transmit power.

10. The system of claim 1, wherein the control circuit adjusts a first signal associated with one of the transmit path and the receive path to match at least one parameter of a second signal associated with another one of the transmit path and the receive path, wherein the first signal and the second signal are associated with the leakage between the transmit path and the receive path.

11. A method, comprising:
    generating a receive control signal based on:
    leakage between a transmit path and a receive path in a transceiver,
    at least one signal applied or generated in the transmit path, and
    at least one signal applied or generated in the receive path; and
    applying the receive control signal to adjust or control processing of received signals.

12. The method of claim 11, comprising setting one or more characteristics associated with the receive control signal based on one or more control signals applied to the transmit path.

13. The method of claim 11, comprising applying filtering during generation of the receive control signal.

14. The method of claim 13, comprising generating each filtering output, during the filtering, based on applying a plurality of weighted adjustments to each filtering input.

15. The method of claim 13, comprising determining one or more coefficients for use during the filtering.

16. The method of claim 15, comprising generating based on the one or more coefficients, a plurality of weights for use during the filtering.

17. The method of claim 11, comprising tracking characteristics of one or more signals in the transmit path that leak into the receive path.

18. The method of claim 11, comprising tracking transmit power.

19. The method of claim 11, comprising adjusting the receive control signal based on transmit power.

20. The method of claim 11, comprising adjusting a first signal associated with one of the transmit path and the receive path to match at least one parameter of a second signal associated with other one of the transmit path and the receive path.

21. The method of claim 20, wherein the first signal and the second signal are associated with the leakage between the transmit path and the receive path.

* * * * *